Oct. 29, 1935.          H. C. LORD            2,019,052
                          JOINT
                  Original Filed July 31, 1931
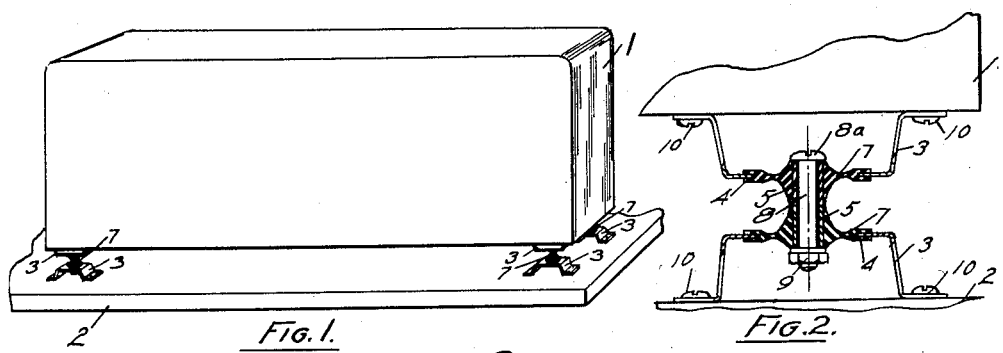
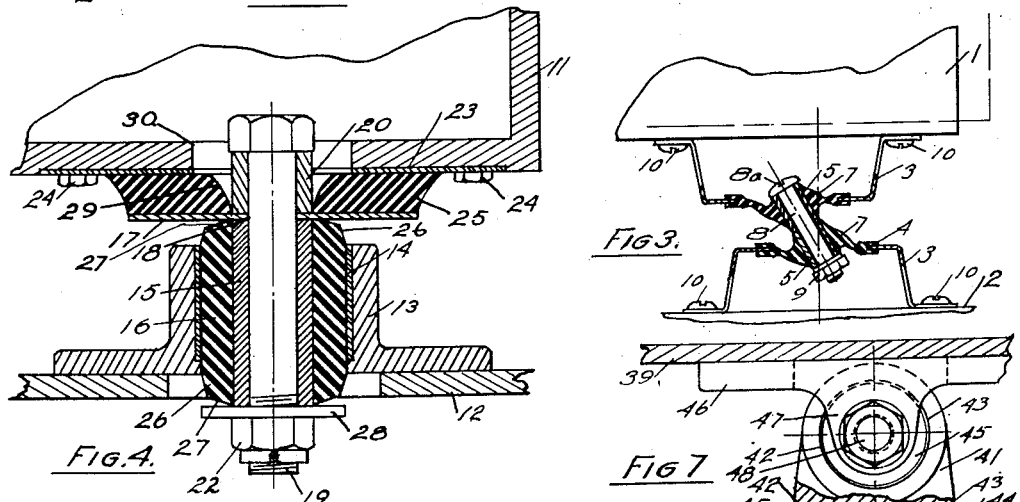
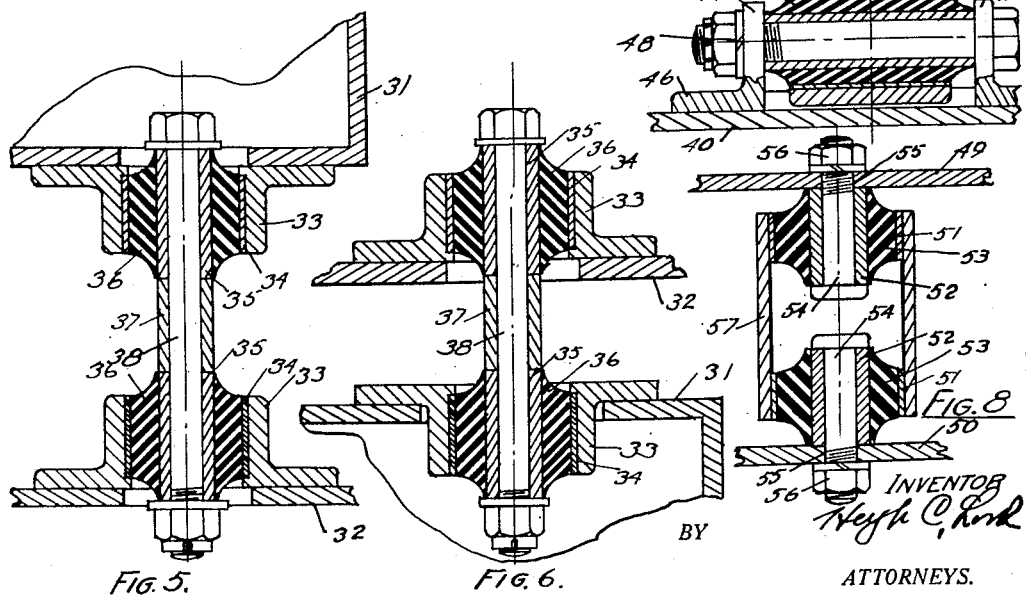

Patented Oct. 29, 1935

2,019,052

UNITED STATES PATENT OFFICE 2,019,052

JOINT

Hugh C. Lord, Erie, Pa.

Application July 31, 1931, Serial No. 554,283
Renewed November 6, 1933

28 Claims. (Cl. 248—22)

Joints have been provided between members yieldingly connecting them. In many situations it is desirable to increase the yielding of the joints over that of a direct stress of the material, such as rubber, in the joints and also to provide for the free yielding of the joints in different planes. Such joints may be used for various purposes. I have exemplified the invention, however, as a mounting. In many vibrating instruments there is vibration in more than one plane and in many situations there are shocks in more than one plane and it is desirable to cushion the supported member, therefore, as against these various strains. Ordinary blocks of rubber set under a supporting member would yield more or less in more than one direction, but rubber subjected to direct stress (the rubber in stress being directly in line with the thrust creating the stress) is usually not yieldable enough, or does not have a period which makes it adaptable for absorbing vibrations, or shocks in an efficient manner. The present invention is designed to provide a simple and efficient mounting which will yield in more than one plane and preferably in several directions in one of the planes, so as to make, in its preferred form, a mounting yieldable universally and with a resistance that may be related so as to best adapt the structure to the various shocks for which the mounting is designed. Features and details of the invention will appear from the specification and claims.

Preferred embodiments of the invention are illustrated in the accompanying drawing as follows.

Fig. 1 shows a perspective view of a supporting and supported member with interposed mountings.

Fig. 2 a sectional view of the mounting used in Fig. 1.

Fig. 3 a similar view to Fig. 2 with the mountings subjected to severe lateral thrust.

Fig. 4 a sectional view of an alternative form of mounting.

Fig. 5 a sectional view of an alternative mounting corresponding somewhat to the structures of Figs. 2 and 3.

Fig. 6 shows a structure similar to Fig. 5, but with the load suspended as distinguished from having the load above the point of support, as in Fig. 5.

Fig. 7 shows a mounting responsive to thrusts in diverse planes, but particularly yieldable only in certain directions in those planes.

Fig. 8 shows an alternative construction with the connection between the units secured to the outer walls of the units.

In the structure shown in Figs. 1 to 3, 1 marks the supported member and 2 the supporting member. The mounting is formed of two units, each having a plate 3 with an opening 4 therethrough, a central hollow member 5 and an interposed rubber element 7 overlapping and bonded to the plate on the opposite faces of the plate adjacent to the opening and to the central sleeve. Preferably this bonding is done during vulcanization so as to place the rubber under initial tension as it shrinks in cooling. The central sleeves are connected by a bolt 8 having a head 8a at one end and a nut 9 at the other end so as to clamp the two mountings together. The plates 3 are preferably provided with feet which are secured by screws 10 to the supported and supporting members.

It will be noted that in this mounting the rubber elements are subjected to shear as they are subjected to direct axial thrust. As the supported member is subjected to lateral thrust in any direction, the central members are tilted. Thus the connection between the elements is a wobbling connection yielding in every direction. The distortion of the rubber, even under the lateral thrust is very largely in shear. The double mounting is twice as soft to axial thrust as the single mounting because with the same thrust the yield of each rubber element is equal and this yielding cumulates. Thus it is possible to have a mounting just twice as soft, but with an ultimate breaking load-carrying capacity equal to the single mounting. It is possible also to so relate the parts that the yield laterally may be softer than the axial yielding by extending the connection. So that taking into consideration the environment, the yield may be proportioned in the different directions to properly cushion the movement.

In the construction shown in Fig. 4, 11 marks the supported member and 12 the supporting member. The supporting member has a bracket 13 in which is arranged an annular shell 14 of a mounting unit. The shell 14 is opposed by a sleeve 15 and a rubber element 16 is interposed between the shell and the central sleeve, the rubber being bonded preferably by vulcanization to the surfaces of the shell and sleeve, and thus placed under initial tension. A plate 17 rests on the upper end of the sleeve. The plate has an opening 18 registering with the opening in the sleeve and a bolt 19 extends through the plate and the opening and through a spacer 20, the head of the bolt resting on the spacer and a nut 22 arranged at the bottom of the bolt. The bolt clamps the sleeve, plate 17 and spacer together.

A plate 23 is secured to the supported member 11 by bolts 24 and a rubber member 25 is bonded to the plates 17 and 23. It will be noted in this structure that the gravity load, or axial thrusts are sustained by the rubber element 16 in shear, and it will be noted that the lateral thrust in every direction are sustained by the rubber element 25 in shear. In order to arrest an abnormal movement extensions 26 are arranged at the ends of the element 16 and these extensions have beveled ends 27. These beveled ends engage the plate 17, or a plate 28 at the bottom of the sleeve and thus arrest the abnormal movement of the lower mounting unit. The element 25 has the wall 29 of the opening spaced from the spacer 20, the wall of the element projecting from the edge of an opening 30 of the member 11, so that with an excessive lateral thrust the wall 29 is brought against the spacer 20, thus arresting the lateral movement. The abruptness with which this lateral movement is arrested depends on the shape of the wall 29 and the extension of the projection of the rubber from the wall of the opening 30. Here again the strength or resistance of the lower unit may be so formed as to properly take care of its thrusts and the element 25 by the quality of the rubber, or its thickness may be so yielding as to properly take care of the lateral thrusts.

In the structure shown in Fig. 5 the units are somewhat similar to those shown in Figs. 2 and 3. 31 marks the supported member, and 32 the supporting member. Brackets 33 are secured to these members and the outer shells 34 of the mounting units are pressed into the brackets. Each units is provided with an inner sleeve 35 within the shell and rubber elements 36 are bonded to the surfaces of the sleeve and shell. A spacer 37 is arranged between the sleeves and the assembly is bolted together by a bolt 38 which extends through the sleeves 35 and the spacer. Here the axial thrusts are in shear in the two units, both units yielding and cumulating and the lateral thrusts are absorbed by the wobbling of the connection in the units.

An exactly similar structure is shown in Fig. 6 except that the supported member 31 is placed below the supporting member 32 so that the connection between the units is in tension while the connection in Fig. 5 is in compression. As the connection wobbles under lateral thrust, the load tends to extend with the wobbling movement where compression is used, whereas when the load is suspended the load tends to restrict the movement. It will be understood that each of the structures shown in compression, as in Figs. 2 and 4, may be arranged in reverse order. The flange of the part 33, however, as shown is secured to the part 31 by any suitable method, as welding.

In some installations it is desirable to have the mounting sensitive in diverse planes and at the same time have it restricted as to the direction of yieldability in these planes. Such a structure is illustrated in Fig. 7. In this structure, 39 marks the supported member and 40 the supporting member. A cross member 41 is provided with cross openings 42. Outer shells 43 of mountings are pressed into the openings 42. Inner sleeves 44 are provided within the sleeves and rubber elements 45 are bonded to the surfaces of the sleeve and shell, preferably during vulcanization. Brackets 46 are secured to the supported and supporting members. These have projecting ears 47 which engage the ends of the sleeves 44 and bolts 48 extend through the sleeves and ears, thus securing one unit to the supporting member and the other unit to the supported member. One unit has its axis arranged crosswise of the other unit. Thus this mounting is sensitive to thrusts in diverse planes, but is limited in its sensitiveness to thrusts in but one direction in each plane.

In Fig. 8, I have shown a modification in which 49 marks the supported member and 50 the supporting member. The mounting units have outer shells 51, central sleeves 52 and interposed elements 53 of rubber bonded to the surfaces of the shells and sleeves. Bolts 54 extend through each of the sleeves and through openings 55 in the members 49 and 50. Nuts 56 are arranged on the outer ends of the bolts so as to clamp the sleeves on the members 49 and 50. The bolts are preferably pressed into the sleeves 52 so as to secure them in place and against turning. A connection 57 in the form of a tube is secured to the shells 51. In effect this is a reversal of the structure shown in Fig. 5, but it has some functional advantages in that the unit as a whole may be factory fabricated so that the user, or purchaser simply needs to supply the opening 55 in his members to be supported to assemble the unit.

While I have exemplified the invention specifically as a mounting I do not wish to be limited to such application as it is desirable in many joints to provide a more yielding connection than can be readily obtained with rubber under direct stress, or of sufficient ultimate strength for the purpose, and while I have shown the structure as involving two units, each of which is subjected to distortion through the wobbling action of the connection, I do not wish to be limited in the broadest claim to a structure in which the connection involves two rubber units as an extension from one unit will, at a point remote from the unit, give a free movement corresponding to the amount of the extension. Other variations may be made in the structure and I, therefore, do not wish to be limited to the precise structure, or application disclosed. The units for the rubber are disposed so as to exert less resistance to a movement of the joint as a whole in diverse planes than would be exerted by the rubber elements if subjected to direct stress, that is to say, a stress in which the rubber sustaining the stress is directly in line with the thrust creating the stress.

It will be noted that with the plate form mounting, such as shown in Figs. 1, 2 and 3 wherein the outer member is in the form of a sheet plate and the rubber overlaps this surface that the axial dimension of the supporting plate is comparatively very slight and, therefore, permits of more freedom of the rubber under the wobbling action of the connection than where the rubber is supported only by a cylindrical wall. The extended overlapped surface gives ample space for the union without restricting the rubber movement above, or below the union, if the union is on both surfaces of the plate. This freedom becomes comparatively greater as the axial thickness of the rubber wall is increased.

What I claim as new is:—

1. In a support, two joint units, each unit having a thrust exerting member and a thrust receiving member receiving the thrust of the thrust exerting member, and an interposed rubber element between and bonded to the members of each unit and communicating the thrust from the thrust exerting member to the thrust receiving member, the thrust receiving member of one unit and the thrust exerting member of the other unit being connected and the rubber element of each unit being disposed to its members and the rubber element of the companion unit to accommodate the major portion of the movement of the initial thrust exerting member relatively to the ultimate thrust receiving member of the companion unit in diverse planes with a relative movement of the members of one unit for each plane in directions other than directly toward or from each other, the rubber for at least one of the units being disposed to take the thrust in one of the diverse planes in shear whereby the major portion of the movement in diverse planes is accommodated by a stress of rubber other than direct compression or tension.

2. In a support, two joint units, each unit having a thrust exerting member and a thrust receiving member receiving the thrust of the thrust exerting member and an interposed rubber element between and bonded to the members of each unit and communicating the thrust from the thrust exerting member to the thrust receiving member, the thrust receiving member of one unit and the thrust exerting member of the other unit being connected and the rubber element of each unit being disposed to its members and the rubber element of the companion unit to accommodate the major portion of the movement of the initial thrust exerting member relatively to the ultimate thrust receiving member of the companion unit in diverse planes with a relative movement of the members of one unit for each plane in directions other than directly toward or from each other, the rubber in both units being disposed to take the thrust in both diverse planes in shear, whereby the major portion of the movement in diverse planes is accommodated by a stress of rubber other than direct compression or tension.

3. In a support, two joint units, each unit having a thrust exerting member and a thrust receiving member receiving the thrust of the thrust exerting member, and an interposed rubber element between and bonded to the members of each unit and communicating the thrust from the thrust exerting member to the thrust receiving member, the thrust receiving member of one unit and the thrust exerting member of the other unit being connected and the rubber element of each unit being disposed to its members and the rubber element of the companion unit to accommodate the major portion of the movement of the initial thrust exerting member relatively to the ultimate thrust receiving member of the companion unit in diverse planes with a relative movement of the members of one unit for each plane in directions other than directly toward or from each other, one of the units having its rubber so disposed to take the thrust in one plane through shear and the other of said units having its rubber so disposed as to take the thrust in diverse directions in the other plane in shear.

4. In a support, two joint units, each unit having a thrust exerting member and a thrust receiving member receiving the thrust of the thrust exerting member, and an interposed rubber element between and bonded to the members of each unit and communicating the thrust from the thrust exerting member to the thrust receiving member, the thrust receiving member of one unit and the thrust exerting member of the other unit being connected and the rubber element of each unit being disposed to its members and the rubber element of the companion unit to accommodate the major portion of the movement of the initial thrust exerting member relatively to the ultimate thrust receiving member of the companion unit in diverse planes with a relative movement of the members of one unit for each plane in directions other than directly toward or from each other, the rubber of one of the units being so disposed as to take the thrust in one plane in shear under normal stress and having bottoming portions subjecting the rubber to compression sustaining abnormal stresses.

5. In a support, two joint units, each unit having a thrust exerting member and a thrust receiving member receiving the thrust of the thrust exerting member, and an interposed rubber element between and bonded to the members of each unit and communicating the thrust from the thrust exerting member to the thrust receiving member, the thrust receiving member of one unit and the thrust exerting member of the other unit being connected and the rubber element of each unit being disposed to its members and the rubber element of the companion unit to accommodate the major portion of the movement of the initial thrust exerting member relatively to the ultimate thrust receiving member of the companion unit in diverse planes with a relative movement of the members of one unit for each plane in directions other than directly toward or from each other, the rubber in both units being so disposed as to take the thrust in both diverse planes in shear under normal stress and having bottoming portions subjecting the rubber to compression sustaining abnormal stresses.

6. In a support, two joint units, each unit having a thrust exerting member and a thrust receiving member receiving the thrust of the thrust exerting member, and an interposed rubber element between the members of each unit and communicating the thrust from the thrust exerting member to the thrust receiving member, the thrust receiving member of one unit and the thrust exerting member of the other unit being connected and the rubber element of each unit being disposed to its members and the rubber element of the companion unit to accommodate the major portion of the movement of the initial thrust exerting member relatively to the ultimate thrust receiving member of the companion unit in diverse planes with a relative movement of the members of one unit for each plane in directions other than directly toward or from each other, the rubber in one of the units being bonded to one of the members of the unit and so disposed as to take the thrust in one plane in shear.

7. In a support two joint units, each unit having a thrust exerting member and a thrust receiving member receiving the thrust of the thrust exerting member, and an interposed rubber element between the members of each unit and communicating the thrust from the thrust exerting member to the thrust receiving member, the thrust receiving member of one unit and the thrust exerting member of the other unit being connected and the rubber element of each unit being disposed to its members and the rubber element of the companion unit to accommodate the major portion of the movement of the initial thrust exerting member relatively to the ultimate thrust receiving member of the companion unit in diverse planes with a relative movement of the members of one unit for each plane in directions other than directly toward or from each other, the rubber of one of the units being bonded to both its members and disposed with relation to the members to take the thrust in one plane in shear.

8. In a support, two units each having a load thrust exerting member and a load thrust receiving member receiving the thrust of the thrust exerting member and an interposed rubber element between the members of each unit sustaining the thrust upon the unit, the rubber element of one of the units being bonded to both members of the unit, and the thrust receiving member of one unit and the thrust exerting member of the other unit being connected and free to wabble through the distortion of the rubber element relatively to the other members of the units, the rubber elements of the units being disposed to yield through shear distortion of the elements to the thrusts of one unit toward and from the other unit and to permit through its distortion the wabbling action of the connected members to accommodate an offsetting thrust of one unit relatively to the other.

9. In a support, two units each having a load thrust exerting member and a load thrust receiving member receiving the thrust of the thrust exerting member and an interposed rubber element between the members of each unit sustaining the thrust upon the unit, the rubber element of each unit being bonded to one of its members of the unit and the thrust receiving member of one unit and the thrust exerting member of the other unit being connected and free to wabble through the distortion of the rubber element relatively to the other members of the units, the rubber elements of the units being disposed to yield to the thrusts of one unit toward and from the other unit and to permit through its distortion the wabbling action of the connected members to accommodate an offsetting thrust of one unit relatively to the other.

10. In a support, two units each having a load thrust exerting member and a load thrust receiving member receiving the thrust of the thrust exerting member and an interposed rubber element between the members of each unit sustaining the thrust upon the unit, the rubber element of each unit being bonded to both members of its unit and the thrust receiving member of one unit and the thrust exerting member of the other unit being connected and free to wabble through the distortion of the rubber element relatively to the other members of the units, the rubber elements of the units being disposed to yield to the thrusts of one unit toward and from the other unit and to permit through its distortion the wabbling action of the connected members to accommodate an offsetting thrust of one unit relatively to the other.

11. In a support, two units, each unit having a load thrust exerting member and a load thrust receiving member receiving the thrust of the thrust exerting member and each unit having opposing outer and inner parts and an interposed rubber element between the outer parts and inner parts of each unit sustaining the thrust of the unit, the rubber element of each unit being bonded to one of the parts of its units and the thrust receiving member of one unit and the thrust exerting member of the other unit being connected and free to wabble through distortion of the rubber element relatively to the other members of the units, the rubber elements of the units being disposed to yield to the thrusts of one unit toward and from the other unit and to permit through its distortion the wabbling action of the connected members to accommodate an offsetting thrust of one unit relatively to the other.

12. In a support, two units, each unit having a thrust exerting member and a thrust receiving member receiving the thrust of the thrust exerting member, one of said members in one unit having an annular wall and the other member in said unit being within the projected area of the annular wall, and an interposed rubber element between and bonded to one of the members of each unit, and the thrust receiving member of one unit and the thrust exerting member of the other unit being connected and free to wabble through the distortion of the rubber element relatively to the other members of the units, the rubber elements of the units being disposed to yield to the thrust of one unit toward and from the other unit and to permit through its distortion the wabbling action of the connected members to accommodate an offsetting thrust of one unit relatively to the other.

13. In a support, two units, each unit having a thrust exerting member and a thrust receiving member receiving the thrust of the thrust exerting member, one of the members of each unit having an annular wall and the other member of each unit being arranged within the projected area of the annular wall, and an interposed rubber element between and bonded to both members of each unit, and the thrust receiving member of one unit and the thrust exerting member of the other unit being connected and free to wabble through the distortion of the rubber element relatively to the other members of the units, the rubber elements of the units being disposed to yield to the thrust of one unit toward and from the other unit and to permit through its distortion the wabbling action of the connected members to accommodate an offsetting thrust of one unit relatively to the other.

14. In a support, two units, each unit having a thrust exerting member and a thrust receiving member receiving the thrust of the thrust exerting member, one of the members of each unit having an annular wall and the other member of each unit being arranged within the projected area of the annular wall and an interposed rubber element between and bonded to both members of each unit, and the thrust receiving member of one unit and the thrust exerting member of the other unit being connected and free to wabble through the distortion of the rubber element relatively to the other members of the units, the rubber elements of the units being disposed to yield through shear distortion of the elements to the thrust of one unit toward and from the other unit and to permit through the distortion the wabbling action of the connected members to accommodate an offsetting thrust of one unit relatively to the other.

15. In a support, two units to be connected, one of the units having a thrust exerting part and a thrust receiving part receiving the thrust from the thrust exerting part, one of the parts having a connection with the companion unit, the connection providing for wabbling movement between the part and the companion unit, and an interposed rubber element between the parts sustaining the thrust between the parts, and bonded to at least one of said parts, the said rubber element permitting through its distortion a wabbling movement between the parts and yielding to the thrusts on the units toward and from each other and accommodating a relative offsetting of the members by the relative wabbling action of the parts.

16. In a support, two units to be connected, one of the units having a thrust exerting part and a thrust receiving part receiving the thrust from the thrust exerting part, one of the parts having a connection with the companion unit, the connection providing for wabbling movement between the part and the companion member, and an interposed rubber element between the parts sustaining the thrust between the parts and bonded to both of said parts, the said rubber element permitting through its distortion a wabbling movement between the parts and yielding to the thrusts on the units toward and from each other and accommodating a relative offsetting of the members by the relative wabbling action of the parts.

17. In a support, the combination of a joint having a supporting member and a supported member, one of the members having a supporting wall substantially undistortable under normal load; a comparatively flexible rubber element between the members having union with and projecting from the supporting wall in load-carrying relation thereto and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

18. In a support, the combination of a joint having a supporting member and a supported member, one of the members having a supporting wall substantially undistortable under normal load; a comparatively flexible rubber element between the members having union with and projecting from the supporting wall and bonded to the other member in load-carrying relation to the wall and member and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

19. In a support, the combination of a joint having a supporting member and a supported member; a comparatively flexible rubber element between the members bonded to and projecting from one of the members in load-carrying relation thereto and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

20. In a support, the combination of a joint having a supporting member and a supported member; a comparatively flexible rubber element between the members bonded to and projecting from one of the members and bonded to the other member in load-carrying relation to the members and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

21. In a support, the combination of a joint having a supporting and a supported member, one member having an annular wall substantially undistortable under normal load and the other member being within the projected area of the annular wall; a comparatively flexible rubber element between the members having union with and projecting from the annular wall in load-carrying relation thereto and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

22. In a support, the combination of a joint having a supporting and a supported member, one member having an annular wall substantially undistortable under normal load and the other member being within the projected area of the annular wall; a comparatively flexible rubber element between the members having union with and projecting from the annular wall and bonded to the other member in load-carrying relation to the wall and member and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

23. In a support, the combination of a joint having a supporting and a supported member, one member having an annular wall and the other member being within the projected area of the annular wall; a comparatively flexible rubber element between the members bonded to and projecting from the annular wall in load-carrying relation thereto and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

24. In a support, the combination of a joint having a supporting and a supported member, one member having an annular wall and the other member being within the projected area of the annular wall; a comparatively flexible rubber element between the members bonded to and projecting from the annular wall and bonded to the other member in load-carrying relation to the wall and the member and so arranged and disposed as to sustain the major portion of the load thrust between the members on the element of the joint in shear; a rocking extension on one of the members in load thrust relation thereto, the element accommodating the shear and rocking movement between the members through distortion of the element; and load means in flexible and thrust relation to the extension.

25. In a support, the combination of a joint having a supporting member and a supported member, one of the members having a sheet plate substantially undistortable under normal load; a comparatively flexible rubber element between the members overlapping and having union with the surface of the sheet plate and projecting edgewise from the sheet plate into free space and with the overhanging portion in load-carrying relation thereto; a rocking extension on one of the members in load thrust relation thereto, the element accommodating the rocking movement between the members through distortion of the element; and load means in flexible and thrust relation to the extension.

26. In a support, the combination of a joint having a supporting member and a supported member, one of the members being in the form of a sheet plate with an opening therein; a comparatively flexible rubber element overlapping the edge of the opening and the overlapping portion having union with the surface of the plate, said element projecting into free space within the projected area of the opening; a rocking extension secured to and in load thrust relation to the projecting portion of the element, the element accommodating the rocking movement between the members through distortion of the element; and load means in flexible and thrust relation to the extension.

27. In a support, the combination of a joint having two units, each unit having a supporting member and a supported member, one of the members of each unit being in the form of a sheet plate with an opening therein; a rubber element in each unit overlapping a surface along the edge of the opening in the plate of each unit and having a union with the overlapped surface of the plate of its unit; and a wobbling connection between said elements accommodating the movement of the units toward each other in shear and relatively sidewise movement of the plates by a wobbling movement of the connection.

28. In a support, the combination of a joint having two units, each unit having a supporting member and a supported member, one of the members of each unit being in the form of a sheet plate with an opening therein; a rubber element in each unit overlapping both surfaces along the edge of the opening in the plate of each unit and having a union with the overlapped surface of the plate of its unit; a wobbling connection between said elements accommodating the movement of the units toward each other in shear and relatively sidewise movement of the plates by a wobbling movement of the connection.

HUGH C. LORD.